United States Patent
Geixman et al.

(10) Patent No.: US 7,166,143 B2
(45) Date of Patent: Jan. 23, 2007

(54) METHOD FOR PRODUCING INDIUM POWDER

(75) Inventors: Vsevolod Vladimirovich Geixman, Chelyabinsk (RU); Leonid Aleksandrovich Kazanbaev, Chelyabinsk (RU); Pavel Aleksandrovich Kozlov, Chelyabinsk (RU); Aleksandr Vasilievich Kolesnikov, Chelyabinsk (RU); Vladimir Leonidovich Kubasov, Moscow (RU); Sergei Anatolevich Zagrebin, Chelyabinsk (RU)

(73) Assignee: Otkrytoe Aktsionernoe Obschestvo "Chelyabinsky Tsinkovy Zavod", Chelyabinsk (RU)

( * ) Notice: Subject to any disclaimer, the term of this patent is extended or adjusted under 35 U.S.C. 154(b) by 61 days.

(21) Appl. No.: 11/050,921

(22) Filed: Feb. 4, 2005

(65) Prior Publication Data

US 2005/0132844 A1 Jun. 23, 2005

Related U.S. Application Data

(63) Continuation of application No. PCT/RU2003/000138, filed on Apr. 4, 2003.

(30) Foreign Application Priority Data

Apr. 5, 2002 (RU) .............................. 2002108636

(51) Int. Cl.
*C22B 58/00* (2006.01)

(52) U.S. Cl. .......................................... 75/364; 75/370

(58) Field of Classification Search ................ 75/364, 75/365, 369, 370
See application file for complete search history.

(56) References Cited

U.S. PATENT DOCUMENTS

| 4,406,693 A | | 9/1983 | Heshmatpour et al. | |
| 4,565,673 A | * | 1/1986 | Kataoka et al. | 423/112 |
| 4,859,499 A | | 8/1989 | Sauvinet et al. | |
| 4,937,148 A | * | 6/1990 | Sato et al. | 423/618 |
| 6,319,483 B1 | * | 11/2001 | Kudo et al. | 423/127 |
| 2005/0008847 A1 | * | 1/2005 | Kishimoto et al. | 428/328 |

FOREIGN PATENT DOCUMENTS

| EP | 0192009 | | 8/1986 |
| JP | 63-140047 A | * | 6/1988 |
| JP | 63-270404 A | * | 11/1988 |
| JP | 1156437 | | 6/1989 |
| JP | 05156381 | | 6/1993 |
| RU | 2209707 | | 8/2003 |

OTHER PUBLICATIONS

Zelikman, A.N. et al., "Rare Metals Metallurgy", Moscow: Metallurgy, 1978, pp. 467-469, 3rd Revised Edition, Moscow, Russia.
"Acquisition of Indium Powder", Color Metals, 1988, pp. 28-29, Issue 8, Ruda i Metally Publishing House, Moscow, Russia.

* cited by examiner

*Primary Examiner*—George Wyszomierski
(74) *Attorney, Agent, or Firm*—Houston Eliseeva LLP

(57) ABSTRACT

The invention relates to non-ferrous metallurgy and may be used for zinc and indium containing materials processing resulting in fine indium powder production by converting indium into a salt compound and subsequent treatment of the latter with a water solution in two stages using a water re-distillate and an acetic acid solution.

19 Claims, No Drawings

METHOD FOR PRODUCING INDIUM POWDER

CROSS-REFERENCE TO RELATED APPLICATIONS

This application is a continuation of International Application PCT/RU2003/000138, filed on Apr. 4, 2003, designating the United States of America, which in turn claims priority to Russian patent application RU2002108636, filed on Apr. 5, 2002.

FIELD OF THE INVENTION

The invention refers to non-ferrous metallurgy and may be used for indium powder production while processing or recycling materials containing zinc and indium.

BACKGROUND OF THE INVENTION

The method of producing indium powder by means of compressed air pulverization of molten indium is known (Tsvetniye Metally, 1988, No. 8, p. 28–29). The disadvantage of said method is low yield of fine fraction at minus 1–2 microns.

The most similar method to this method with regard to the technical concept and result is a method comprising the stage of refining indium sponge under a layer of alkali, crude indium smelting underneath a layer of chloride melt, salt melt treatment in an aqueous solution with fine metal indium particle recovery due to a disproportioning reaction of indium chloride in an aqueous solution (Zelikman A. N. et al., Rare Metals Metallurgy. M.: Metallurgiya, 1978, p. 467).

The disadvantage of the above method is contamination of fine metal indium particles evolved from the solution due to the disproportioning reaction (1, 2) with zinc hydroxide and particle coarsening under subsequent dosage of hydrochloric acid solution.

(1)

(2)

BRIEF SUMMARY OF THE INVENTION

The technical result of the present invention is the production of high-purity fine indium powder conforming to the indium grade In-000.

The technical result is achieved due to the fact that in the method of indium powder production including stages of indium sponge refining underneath a layer of alkali, crude indium smelting underneath a layer of chloride melt salt melt treatment with water solution is conducted in two stages using water redistillate at the first stage and acetic acid solution in water redistillate at pH 2.0–2.5 at the second stage.

BRIEF DESCRIPTION OF THE SEVERAL VIEWS OF THE DRAWING(S)

Not Applicable.

DETAILED DESCRIPTION OF THE INVENTION

Indium sponge melts at 320–350° C. in steel crucibles underneath a layer of sodium alkali. Most of lead, zinc, tin, aluminum, and gallium impurities go to an alkali melt, while crude indium undergoes deeper purification underneath a layer of $ZnCl_2$ and $NH_4Cl$ salt melt. In the meanwhile, the indium changes into slag (salt melt) in the form of indium chlorides: $InCl_2$ and $InCl$. Disproportioning of the re-distillate (distilled water formed as a result of double distillation) in an aqueous solution is used for metal indium recovery from slag and its separation from cadmium impurity. Disproportioning reaction results in the production of fine metal indium powder. Afterwards, the powder is treated with twice-distilled aqueous solution of acetic acid at pH 2.0–2.5. Then the powder is washed with distilled water and dehydrated with ethanol. The mixture of indium powder and alcohol is filtrated. The ethanol is returned into circulation, while fine indium powder is dried at 45–50° C. over 5–6 hours.

The tests had shown that the treatment of salt melt with aqueous solution in two stages, water re-distillate being used in the first stage and a water re-distillate solution of acetic acid being used in the second stage at pH 2.0–2.5, allows production of fine indium powder of high purity conforming to the indium grade In-000.

When ordinary or distilled water is used at the first stage of salt melt treatment, indium quality does not conform to the In-000 grade. The use of acetic acid solution at pH 2.0–2.5 ensures the production of fine powder at minus 1.3 micron at 50–55% level. At pH higher than 2.5, the indium's quality gets worse, while at pH lower than 2.0 the yield of fraction minus 1.3 micron is reduced.

The following test was run. Zinc chloride, $NH_4Cl$, and crude indium of the following composition, %: indium 99.6; iron $5·10^{-3}$; cadmium $11·10^{-3}$; copper $52·10^{-3}$; arsenic $1·10^{-3}$; nickel $26·10^{-3}$; tin $25·10^{-3}$; mercury $1·10^{-4}$; lead $52·10^{-3}$; thallium $14,5·10^{-3}$; zinc $6,5·10^{-3}$, not conforming to GOST 10297-94 (below the indium grade –2), were fed into a reactor (V=7 $dm^3$) and melted at 250–260° C. The melt obtained was held during 7 hours. The termination of the process of indium chloride formation was judged by the cessation of ammonia evolution and by the chemical analysis data. Thus obtained indium chlorides were cooled and then processed in a reactor with re-distillate at the liquid/solid ratio of (3.5–4.5)/1 over 0.5 hours. Then the re-distillate was removed by decantation. After the re-distillate had been removed, the indium was treated with a re-distillate solution of acetic acid at the pH of 2.0–2.5 and liquid/solid ratio of (4–5)/1 over 20 minutes under an intensive air sparging. The indium powder received was washed with distilled water at the liquid/solid ratio of 4/1. The powder washed from impurities and acetic acid residue was dehydrated with ethanol. The mixture of indium powder and alcohol was subjected to filtration. The ethanol was returned into circulation, and the high-purity fine indium powder was dried at 45–50° C. (over 5–6 hours). The produced powder was analyzed for residual content of impurities under GOST 10297-94 and then subjected to fraction sieving. The indium powder had the following chemical composition:

Chemical, mass %: indium 99.9995: iron $2·10^{-6}$; cadmium $2·10^{-6}$; copper $7·10^{-6}$; arsenic $5·10^{-5}$; nickel $2·10^{-5}$; tin $5·10^{-5}$; mercury $2·10^{-5}$; lead $1·10^{-5}$; thallium not found; zinc $1·10^{-5}$. It conforms to the Indium-000 grade.

| Granulometric: | | | | | | | | |
|---|---|---|---|---|---|---|---|---|
| Size grade, μ | +36.6 | −36.6 +25.9 | −25.9 +16.4 | −16.4 +11.0 | −11.0 +8.2 | −8.2 +6.7 | −6.7 +1.3 | −1.3 |
| Grade yield, % | 0 | 1.4 | 0.7 | 8.1 | 11.0 | 12.3 | 13.6 | 52.9 |

Solutions coming from the re-distillate washing, as well as from washing of indium powder with distilled water are recycled into the beginning of the process of indium production by extraction from zinc production solutions. The solution of spent acetic acid is utilized at the water treatment plant. The process of indium production integrated in the flow of zinc production caused no problems.

During the testing of the prototype, the crude indium was converted into indium chloride using $NH_4Cl$; and the produced salt was treated with a water solution (ordinary municipal water without additional purification) at the first stage without acidation and then with hydrochloric acid acidation at the concentration of 0.3 g/l. The produced indium powder had the following composition.

Chemical, mass %: indium 99.7: iron $45 \cdot 10^{-4}$; cadmium $1 \cdot 10^{-2}$; copper $5 \cdot 10^{-2}$; arsenic $1 \cdot 10^{-3}$; nickel $2 \cdot 10^{-2}$; tin $24 \cdot 10^{-3}$; mercury $1 \cdot 10^{-4}$; lead $5 \cdot 10^{-2}$; thallium $14 \cdot 10^{-3}$; zinc $5.9 \cdot 10^{-3}$. It dose not conform to GOST (below the Indium-2 grade).

| Granulometric: | | | | | | |
|---|---|---|---|---|---|---|
| Size grade, μ | −50.0 +36.6 | −36.6 +25.9 | −25.9 +16.4 | −16.4 +11.0 | −11.0 +8.2 | −6.7 +1.3 | −1.3 |
| Grade yield, % | 1.5 | 2.7 | 0.9 | 9.8 | 15.0 | 36.7 | 33.4 |

Under the increased hydrochloric acid concentration the particle coarsening has been increasing.

The test results are given in Table 1.

From these data it may be seen that, compared to the known method, the use of the method proposed allows:

a) to produce from crude indium an indium powder of high purity, its chemical composition conforming to GOST grade Indium-000; the prototype method does not make it possible to produce indium powder conforming to GOST.

b) to enhance the degree of dispersion of indium powder with regard to the fine fraction content (−1.7μ) from (32–33%) to (52–53%).

b. smelting the crude indium under a layer of chloride melt to form a salt melt;

c. treating the salt melt with twice distilled water to form indium metal; and d. treating the indium metal with an acetic acid solution in twice distilled water, at a pH in the range of 2.0 to 2.5, to produce the indium powder.

2. The method of claim 1, wherein the indium sponge includes an impurity selected from the group consisting of zinc, lead, tin, aluminum, gallium, cadmium and any combination thereof.

3. The method of claim 1, wherein the crude indium includes an impurity selected from the group consisting of: cadmium, nickel, copper, thallium, arsenic, iron, mercury, tin, lead, zinc and any combination thereof.

4. The method of claim 1, wherein the layer of chloride melt includes zinc chloride and ammonium chloride.

5. The method of claim 1, wherein the indium metal is formed by disproportionating indium chlorides.

6. The method of claim 1, further comprising recovering the indium metal.

7. The method of claim 1, further comprising washing the indium powder with distilled water.

8. The method of claim 7, further comprising dehydrating the washed indium powder.

9. The method of claim 8, wherein ethanol utilized in dehydrating the washed indium is returned into circulation.

10. The method of claim 1, wherein the indium powder has an indium content of 99.9995 mass %.

11. The method of claim 1, wherein the indium powder has a −1.3 micron size grade fraction content of at least 50%.

12. The method of claim 1, further comprising recycling a solution which includes twice distilled water and which is generated in at least one step of the method.

13. The method of claim 1, wherein spent acetic acid generated in step (d) of the method is utilized in a water treatment plant.

Test results of high purity indium powder production

| | | Water solutions | | | Chemical composition | | | | | Indium powder | | |
|---|---|---|---|---|---|---|---|---|---|---|---|---|
| | | 1 stage | | 2 stage | (major components), % | | | | | fraction ó yield, % | | |
| | Method | S:L | Water | S:L | Acid solutions | indium | zinc | cadmium | copper | GOST grade* | +50 μ | +1.3–50 | −1.3 |
| 1 | Proposed | (3.5–4.5):1 | Re-distillate | (4–5):1 | acetic acid solution in re-distillate pH 2.0–2.5 | 99.9995 | $1 \cdot 10^{-5}$ | $1 \cdot 10^{-5}$ | $1 \cdot 10^{-5}$ | Conforming to GOST Indium grade (ref. Indium-000) | 0 | 47.1 | 52.9 |
| 2 | Prototype | (3.5–4.5):1 | Municipal water (without additional purification) | (4–5):1 | hydrochloric acid solution (in water without additional cleaning) 0.3 g/l HCl | 99.7 | $5.9 \cdot 10^{-3}$ | $1 \cdot 10^{-2}$ | $5 \cdot 10^{-2}$ | Not conforming to GOST Indium grade | 1.5 | 65.1 | 33.4 |

*the rest of the impurities are within the tolerance of GOST 10297-94

The invention claimed is:

1. A method for producing indium powder, the method comprising:

a. refining an indium sponge under a layer of alkali to form a crude indium;

14. A method for producing indium powder, the method comprising:

a. smelting crude indium under a layer of chloride melt to form a salt melt; and b. treating the salt melt by a two-stage process to produce the indium powder, wherein the process includes a treatment with twice distilled water and a treatment with an acetic acid solution in twice distilled water, at a pH in the range of 2.0 to 2.5.

15. The method of claim 14, wherein the crude indium includes an impurity selected from the group consisting of: cadmium, nickel, copper, thallium, arsenic, iron, mercury, tin, lead, zinc and any combination thereof.

16. The method of claim 15, wherein the indium powder has an indium content of 99.9995 mass %.

17. The method of claim 14, further comprising washing the indium powder with distilled water.

18. The method of claim 17, further comprising dehydrating the washed indium powder.

19. The method of claim 14, further comprising recycling a solution which includes twice distilled water and which is generated in at least one step of the method.

\* \* \* \* \*